United States Patent [19]

Ranbom

[11] 4,394,369

[45] Jul. 19, 1983

[54] HYDROGEN PEROXIDE PROCESS

[75] Inventor: Wayne Ranbom, Pennington, N.J.

[73] Assignee: FMC Corporation, Philadelphia, Pa.

[21] Appl. No.: 381,592

[22] Filed: May 24, 1982

[51] Int. Cl.$^3$ ............................................. C01B 15/02
[52] U.S. Cl. ..................................................... 423/588
[58] Field of Search ......................................... 423/588

[56] References Cited

U.S. PATENT DOCUMENTS

| | | | |
|---|---|---|---|
| 2,215,883 | 9/1940 | Riedl et al. | 23/207 |
| 2,537,516 | 1/1951 | Dawsey et al. | 23/207 |
| 2,537,655 | 1/1951 | Dawsey et al. | 23/207 |
| 2,668,753 | 2/1954 | Harris et al. | 23/207 |
| 2,768,065 | 10/1956 | Dawsey et al. | 23/207 |
| 2,768,066 | 10/1956 | Dawsey et al. | 23/207 |
| 2,791,491 | 5/1957 | Hack et al. | 23/207 |
| 2,890,105 | 6/1959 | Farrell | 23/207 |
| 2,919,974 | 1/1960 | Defraisse et al. | 23/207 |
| 2,927,002 | 3/1960 | Le Feuvre | 23/207 |
| 2,975,033 | 3/1961 | Kabisch et al. | 423/589 |
| 2,990,251 | 6/1961 | Richter et al. | 423/588 |
| 3,002,817 | 10/1961 | Villemey | 423/588 |
| 3,038,786 | 6/1962 | Hirotsuka et al. | 23/207 |
| 3,132,001 | 5/1964 | Denmeyer et al. | 23/207 |
| 3,328,128 | 6/1967 | KäeÖïĺ | |
| 3,372,990 | 3/1968 | Charret | 23/207 |
| 3,441,574 | 4/1969 | Morgan et al. | 260/369 |
| 3,671,552 | 6/1972 | Le Bois et al. | 260/369 |
| 3,766,222 | 10/1973 | Hartwig et al. | 260/369 |
| 3,767,778 | 10/1973 | Glesselmann et al. | 423/588 |
| 3,819,818 | 6/1974 | Giesselmann et al. | 423/588 |
| 3,868,395 | 2/1975 | Bantel et al. | 260/369 |
| 3,923,966 | 12/1975 | Vaughan | 423/573 |
| 3,994,932 | 11/1976 | Iwamura et al. | 260/378 |
| 4,046,868 | 9/1977 | Vaughan | 423/588 |

FOREIGN PATENT DOCUMENTS 672419  5/1966  Belgium ............................... 423/589

OTHER PUBLICATIONS

Kirk–Othmer, *Encyclopedia of Chemical Technology*, Third Edition, vol. 13, New York: Wiley–Interscience, (1981), p. 18.

Primary Examiner—O. R. Vertiz
Assistant Examiner—Wayne A. Langel
Attorney, Agent, or Firm—Richard E. Elden; Eugene G. Horsky

[57] ABSTRACT

An anthraquinone autoxidation process has been developed for producing hydrogen peroxide employing N-substituted-2-pyrrolidones as solvents for the anthrahydroquinone formed in the reduction step. These new solvents have improved solubility characteristics over prior solvents. Particular N-substitutents are alkyl and alkaryl groups containing 6 to 12 carbon atoms.

14 Claims, No Drawings

HYDROGEN PEROXIDE PROCESS

The present invention relates to the production of hydrogen peroxide by the reduction and oxidation of a solution containing an anthraquinone or its tetrahydro derivative.

The anthraquinone process for producing hydrogen peroxide is well-known. In this process, a solution of an alkylated anthraquinone is reduced, usually by hydrogen, in the presence of a catalyst to the corresponding anthrahydroquinone. This solution is then oxidized by means of oxygen or air to produce the anthraquinone and hydrogen peroxide. The hydrogen peroxide is removed from this solution, usually by extraction with water, and the regenerated anthraquinone is recycled back to the hydrogenation step. In such a process, 1 mol of hydrogen peroxide is obtained for each mol of the anthraquinone which is reduced and subsequently oxidized. For the purpose of this invention, the term "working compound" is defined as the alkylated anthraquinone, its tetrahydro derivative, and their corresponding anthrahydroquinones; and "working solution" is defined as a solution of the working compound in a suitable solvent or solvents.

The productive capacity of the anthraquinone process is proportional to the solubility of the working compound in both the oxidized and reduced form in the working solution. The solubilities, and hence the productivity, can be increased by modifying the substituent group on the anthraquinone to alter its solubility characteristics—and by using more powerful solvents or solvent combinations.

The commercial anthraquinone processes are generally based on 2-ethyl, 2-tert-butyl, or 2-amylanthraquinone as the working compound. For the purpose of this invention, the term "anthraquinone" shall be considered to include the tetrahydroanthraquinone derivative which is produced as a by-product.

Although the ideal solvent for the anthraquinone process should be relatively inert chemically, the proper selection of the solvent is critical to maximize productivity and efficiency. An ideal solvent combination would have a high solubility for the working compound in both the oxidized and reduced form. The solvent should be chemically stable, poorly water soluble, and non-toxic. Other desirable solvent properties include: a high flash point, a low volatility, and a high partition coefficient for hydrogen peroxide between the solvent and water. In addition, the density, viscosity, and interfacial tension should be such that the solution will not emulsify with water during the stripping or extracting stage.

There has been much activity within the industry in attempting to improve the solvent system. The solvent system generally used includes an aromatic compound as a solvent for the anthraquinones and a polar compound as a solvent for the anthrahydroquinones. Other anthrahydroquinone solvents that have been considered include: secondary alcohols, trialkyl phosphates, tetraalkyl-substituted ureas, dialkylcarboxylic acid amides, a 1,3,5,-triazene, 2,6-dialkylcyclohexanone, pivalate or acetate esters, mono- or diacetylbenzophenone or diacetylbenzene, Kirk-Othmer, *Encyclopedia of Chemical Technology*, Third Edition, Volume 13. New York: Wiley & Sons, 1981, page 18. This recent activity in attempting to find a better solvent for the anthrahydroquinone component in the anthraquinone process indicates the great value that an improved solvent would contribute to the overall process.

It has now been found that 2-pyrrolidones containing a $C_6$ to $C_{12}$ hydrocarbon substituent on the nitrogen (N-substituted-2-pyrrolidones) are excellent solvents for hydroquinones and are useful as a solvent in the anthraquinone process for producing hydrogen peroxide. Further, the N-substituted-2-pyrrolidones can be used in addition to other solvents heretofore employed in the production of hydrogen peroxide, including other polar solvents used as anthrahydroquinone solvents and aromatic solvents conventionally used in the process as anthraquinone solvents. The detailed description of the invention follows in terms of the preferred N-alkyl-2-pyrrolidone embodiment which is particularly useful as a solvent for the polar anthrahydroquinone form of the working compound.

The preferred pyrrolidone compounds are N-alkyl-2-pyrrolidones where the alkyl group contains from 6 to 12 carbon atoms. Examples of the most preferred pyrrolidone compounds are: N-cyclohexyl-2-pyrrolidone, N-1,1,3,3-tetramethylbutyl-2-pyrrolidone, n-octyl-2-pyrrolidone, n-dodecyl-2-pyrrolidone, and n-decyl-2-pyrrolidone. It may be preferred to use a mixture of N-alkyl-2-pyrrolidones which can either be blended together from the pure products or produced from a natural product. An example of the latter is "N-cocoalkyl pyrrolidone" which is derived from a natural product and contains 5 percent $C_8$ alkyl groups, 10 percent $C_{10}$, 59 percent $C_{12}$, 17 percent $C_{14}$, and 9 percent $C_{16}$.

Although an N-alkyl-2-pyrrolidone of the present invention can be used alone as the solvent, the productivity and other properties of the working solution can usually be improved by adding other solvents, such as an aromatic hydrocarbon to increase the solubility of the anthraquinone form of the working compound when an N-alkyl-2-pyrrolidone is the polar solvent used in the working solution. In addition, it may be advantageous to add a conventional anthrahydroquinone solvent, such as tris(2-ethylhexyl) phosphate to modify the hydrogen peroxide distribution coefficient and working solution density and other physical properties of the working solution.

Any conventional working compound can be used as the active ingredient of the working solution. However, it is preferred that the working compound be 2-ethylanthraquinone, 2-t-butylanthraquinone, or 2-amylanthraquinone and/or their tetrahydro derivatives.

The anthraquinone form can be reduced to the corresponding anthrahydroquinone by any convenient reductant. Usually, this is accomplished by conventional hydrogenation using a noble metal catalyst, such as palladium. However, hydrogen sulfide in the presence of a suitable catalyst can also be used as described in U.S. Pat. No. 3,923,966.

The proportions of the components for the working solution can vary over a wide range depending upon the physical requirements of the individual process. It is desirable to maximize the solubility of both the oxidized and reduced form of the working compound. A preferred working solution contains 16 percent to 30 percent working compound, 10 percent to 30 percent of the N-alkyl pyrrolidone, and 50 percent to 61 percent of the anthraquinone solvent (usually an aromatic hydrocarbon or mixture thereof, such as the polyalkylated benzene having 9 to 11 carbon atoms described in U.S. Pat. No. 3,328,128, hereinafter "the aromatic solvent"). From 20 percent to 80 percent of the N-alkyl-2-pyrrolidone may be replaced, in part by a conventional anthrahydroquinone solvent, such as tris(2-ethylhexyl) phosphate.

The practice of this invention will be further explained by the following non-limiting examples:

EXAMPLE 1

The solubility of water and of 2-ethylanthrahydroquinone were determined in several N-alkyl-2-pyrrolidones. The results are presented in Table I. For comparison, the solubility of water and 2-ethylanthrahydroquinones in typical solvents, such as tris(2-ethylhexyl) phosphate, diisobutyl carbinol, and methylcyclohexyl acetate are also included.

EXAMPLE 2

In the following runs working solutions were prepared containing an anthraquinone solvent, an anthrahydroquinone solvent or solvents, and a working compound. This solution was hydrogenated in the presence of a palladium catalyst and the solution was filtered and oxidized; the hydrogen peroxide content was determined and reported as grams of hydrogen peroxide per liter of work solution (g $H_2O_2$/l).

(Run A)

The working solution contained 20 percent ethylanthraquinone (EAQ), 30 percent N-t-octyl-2-pyrrolidone, and 50 percent of the aromatic solvent. The solution was hydrogenated at 48° C. to a depth of 50 percent; no precipitate was observed. The solution was filtered and yielded 12.5 g $H_2O_2$/l.

(Run B)

A working solution containing 10 percent EAQ and 10 percent tetrahydroethylanthroquinone (THEAQ), 20 percent N-1,1,3,3-tetramethylbutyl-2-pyrrolidone, and 60 percent of the aromatic solvent was hydrogenated until a precipitate was observed. The mixture was filtered at 50° C. and yielded 18.1 g $H_2O_2$/l.

(Run C)

A working solution was prepared containing 10 percent each of EAQ and THEAQ. The solvents were 15 percent N-t-octyl-2-pyrrolidone, 15 percent tris(2-ethylhexyl)phosphate, and 50 percent of the aromatic solvent. The solution was hydrogenated to a depth of 55 percent; no precipitate was observed. The solution yielded 15.3 g $H_2O_2$/l.

(Run D)

A solution containing 30 percent EAQ, 15 percent N-cyclohexyl-2-pyrrolidone, and 55 percent of the aromatic solvent was hydrogenated to a depth of 45 percent; no precipitate was observed. The solution yielded 15.7 g $H_2O_2$/l.

(Run E)

A working solution containing 10 percent EAQ, 10 percent THEAQ, 15 percent N-cyclohexyl-2-pyrrolidone, 15 percent tris(2-ethylhexyl)phosphate, and 50 percent of the aromatic solvent was hydrogenated until no further hydrogen was taken up; no precipitate was observed. The solution yielded 25.5 g $H_2O_2$/l.

(Run F)

A working solution was prepared containing 30 percent amylanthraquinone (AAQ), 15 percent N-t-octyl-2-pyrrolidone, and 55 percent of the aromatic solvent. The solution was hydrogenated to a depth of 45 percent but no precipitate was observed. The solution yielded 15.5 g $H_2O_2$/l.

(Run G)

Run 2F was repeated except the hydrogenation was continued until a precipitate was observed. The mixture was filtered at 50° C. and yielded 19.1 g $H_2O_2$/l.

(Run H)

A working solution containing 10 percent EAQ, 10 percent THEAQ, 10 percent N-1,1,3,3-tetramethylbutyl-2-pyrrolidone, 10 percent tris-(2-ethylhexyl) phosphate, and 60 percent of the aromatic solvent were hydrogenated by passing through a bed containing a palladium catalyst until a precipitate was observed on the catalyst. After filtration, the solution contained 13.5 g $H_2O_2$/l.

From the above experiments it is clear that the class of N-alkyl-2-pyrrolidones is an excellent solvent for the anthrahydroquinones used in the hydrogen peroxide process. As shown in (Run E), a mixture of N-cyclohexyl-2-pyrrolidone and tris(2-ethylhexyl)phosphate mixture is particularly effective as a solvent for ethylanthraquinone and its tetrahydro derivative.

The invention has been specifically described in terms of N-alkyl-2-pyrrolidones as the solvent for the anthrahydroquinone component of the working solution. It is apparent that the introduction of an aryl group into the N-substituted moiety will increase the solubility of the anthraquinone component. Specific examples of preferred compounds of this type are N-benzyl-2-pyrrolidone and N-2-phenylethyl-2-pyrrolidone.

TABLE I

| Solubility of Water and 2-Ethylanthrahydroquinone (EHQ) in N—alkyl-2-pyrrolidone and Other Solvents | | |
|---|---|---|
| | Solubility | |
| | Water | % EHQ |
| Alkyl Group in N—alkyl-2-pyrrolidone | | |
| 1-Methylethyl | Miscible | >32.0 |
| 1,4,4-Trimethylbutyl | Miscible | 30.7 |
| Cyclohexyl | Partly Miscible | 29.2 |
| 1,3,3-Trimethylbutyl | <1% | 26.0 |
| Octyl | Insoluble | 24.8 |
| Dodecyl | Insoluble | 15.9 |
| Cocoalkyl* | Insoluble | 17.5 |
| Other Solvents | | |
| Tris-(2-ethylhexyl) phosphate | Insoluble | 16.5 |
| Diisobutyl Carbinol | Insobule | 4.7 |
| Methylcyclohexyl acetate | Insoluble | 5.9 |

*A mixutre of $C_8$, $C_{10}$, $C_{12}$, and $C_{16}$ alkyl groups.

What is claimed is:

1. An improved process for producing hydrogen peroxide by the alternate reduction and oxidation of a substituted anthraquinone and its tetrahydro derivative as the working compound, dissolved in a solvent to constitute a liquid working solution wherein the improvement resides in using a solvent comprising an N-substituted-2-pyrrolidone wherein the substituted moiety is a hydrocarbon containing 6 to 12 carbon atoms.

2. The process of claim 1 wherein the N-substituted-2-pyrrolidone is an N-alkyl-2-pyrrolidone in which alkyl group of the N-alkyl-2-pyrrolidone contains 6 to 12 carbon atoms.

3. The process of claim 2 wherein the N-alkyl-2-pyrrolidone is N-cyclohexyl-2-pyrrolidone.

4. The process of claim 2 wherein the N-alkyl-2-pyrrolidone is N-1,1,3,3-tetramethylbutyl-2-pyrrolidone.

5. The process of claim 2 wherein the N-alkyl-2-pyrrolidone is n-octyl-2-pyrrolidone.

6. The process of claim 2 wherein the N-alkyl-2-pyrrolidone is n-decyl-2-pyrrolidone.

7. The process of claim 2 wherein the N-alkyl-2-pyrrolidone is n-dodecyl-2-pyrrolidone.

8. The process of claim 1, 2, 3, 4, 5, 6, or 7 wherein the working solution contains 10 percent to 30 percent working compound, 10 percent to 30 percent of the N-alkyl-2-pyrrolidone and 50 percent to 61 percent of an aromatic hydrocarbon solvent for the substituted anthraquinone.

9. The process of claim 8 wherein the substituted anthraquinone is selected from the group consisting of 2-ethylanthraquinone, 2-t-butylanthraquinone and 2-amylanthraquinone.

10. The process of claim 1, 2, 3, 4, 5, 6, or 7 wherein the working solution contains 16 percent to 30 percent working compound, 10 percent to 20 percent of the N-alkyl-2-pyrrolidone, 10 percent to 20 percent tris(2-ethylhexyl)phosphate, and 50 percent to 61 percent of an aromatic hydrocarbon solvent for the substituted anthraquinone.

11. The process of claim 10 wherein the substituted anthraquinone is selected from the group consisting of 2-ethylanthraquinone, 2-t-butylanthraquinone and 2-amylanthraquinone.

12. The process of claim 1 wherein the N-substituted-2-pyrrolidone is an N-alkaryl-2-pyrrolidone in which the alkaryl group contains 6 to 12 carbon atoms.

13. The process of claim 12 wherein the N-substituted-2-pyrrolidone is N-benzyl-2-pyrrolidone.

14. The process of claim 12 wherein the N-substituted-2-pyrrolidone is N-2-phenylethyl-2-pyrrolidone.

* * * * *